United States Patent
Dodd et al.

(10) Patent No.: US 7,120,765 B2
(45) Date of Patent: Oct. 10, 2006

(54) MEMORY TRANSACTION ORDERING

(75) Inventors: James M. Dodd, Shingle Springs, CA (US); David Puffer, Tempe, AZ (US)

(73) Assignee: Intel Corporation, Santa Clara, CA (US)

(*) Notice: Subject to any disclaimer, the term of this patent is extended or adjusted under 35 U.S.C. 154(b) by 427 days.

(21) Appl. No.: 10/284,596

(22) Filed: Oct. 30, 2002

(65) Prior Publication Data

US 2004/0088450 A1 May 6, 2004

(51) Int. Cl.
*G06F 12/00* (2006.01)

(52) U.S. Cl. .......................... 711/158; 711/104; 710/38

(58) Field of Classification Search ................ 711/149, 711/104, 158, 167
See application file for complete search history.

(56) References Cited

U.S. PATENT DOCUMENTS

| | | | |
|---|---|---|---|
| 5,603,010 A | 2/1997 | Dodd et al. | |
| 5,630,096 A * | 5/1997 | Zuravleff et al. | 711/154 |
| 6,389,514 B1 | 5/2002 | Rokicki | |
| 6,400,631 B1 | 6/2002 | Williams et al. | |
| 6,401,180 B1 | 6/2002 | Hartmann | |
| 6,434,637 B1 * | 8/2002 | D'Errico | 710/38 |
| 6,505,282 B1 | 1/2003 | Langendorf et al. | |
| 6,507,530 B1 | 1/2003 | Williams et al. | |
| 6,553,449 B1 | 4/2003 | Dodd et al. | |
| 6,625,685 B1 * | 9/2003 | Cho et al. | 711/5 |
| 6,639,820 B1 * | 10/2003 | Khandekar et al. | 365/63 |
| 6,697,888 B1 | 2/2004 | Halbert et al. | |
| 6,725,349 B1 | 4/2004 | Langendorf et al. | |
| 6,738,874 B1 * | 5/2004 | Zsohar | 711/157 |
| 6,742,098 B1 | 5/2004 | Halbert et al. | |
| 6,766,385 B1 | 7/2004 | Dodd et al. | |
| 6,944,686 B1 * | 9/2005 | Naruse et al. | 710/39 |
| 2003/0070055 A1 * | 4/2003 | Johnson et al. | 711/202 |
| 2003/0182513 A1 | 9/2003 | Dodd et al. | |
| 2003/0217244 A1 * | 11/2003 | Kelly | 711/168 |
| 2004/0015645 A1 | 1/2004 | Dodd et al. | |
| 2004/0042320 A1 | 3/2004 | Dodd et al. | |
| 2004/0044832 A1 | 3/2004 | Dodd | |
| 2004/0158677 A1 | 8/2004 | Dodd | |
| 2004/0243768 A1 | 12/2004 | Dodd et al. | |

OTHER PUBLICATIONS

Pending U.S. Appl. No. 10/676,781, P16947, entitled: "Adaptive Page Management", filed on Sep. 30, 2003.
Pending U.S. Appl. No. 09/664,981, P9035, entitled: "Device and Apparatus for Improving Performance of Low-Cost Memory Devices", filed on Sep. 18, 2000.
Pending U.S. Appl. No. 09/644,516, P9606, entitled: "System and Method for Controlling Data Flow Direction in a Memory System", filed Sep. 29, 2000.
Pending U.S. Appl. No. 09/677,137, P9616, entitled: "Method and Apparatus for Managing Power in a Memory Component while Maintaining High Performance", filed Sep. 29, 2000.
Pending U.S. Appl. No. 09/666,789, P9836, entitled: "Buffering Data Transfer Between a Chipset and Memory Modules", filed Sep. 18, 2000.

* cited by examiner

*Primary Examiner*—Matthew Kim
*Assistant Examiner*—Shane M. Thomas
(74) *Attorney, Agent, or Firm*—Ram P. Yadav

(57) ABSTRACT

Machine-readable media, methods, and apparatus are described which order memory transactions to increase utilization of multiple memory channels. In some embodiments, a processor may determine an issue order for memory transactions based on the memory channels that are to service the memory transactions. In some embodiments, the processor attempts to obtain an issue order that minimizes or reduces the number of idle periods experienced by the memory channels. Further, the processor may issue the memory transactions to an external memory controller for servicing in the determined issue order.

24 Claims, 5 Drawing Sheets

MEMORY TRANSACTION ORDERING

BACKGROUND

Computing devices typically comprise a processor, memory, and an external memory controller to provide the processor as well as other components of the computing device with access to the memory. The performance of such computing devices is strongly influenced by the memory bandwidth. Memory bandwidth may be increased and overall memory performance increased by providing a memory controller with multiple memory channels. For example, a memory controller with two memory channels has twice the available memory bandwidth and potentially twice the performance of a memory controller with only a single memory channel. However, memory controllers with multiple memory channels generally do not effectively utilize the additional bandwidth. In particular, such memory controllers typically allow one or more memory channels to experience substantial idle periods despite the processor having memory transactions that need to be serviced. Accordingly, computing device performance may be improved by reducing the frequency and/or duration of memory channel idle periods.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques for a processor to order memory transactions to improve utilization of multiple memory channels. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or, characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Figure 1:
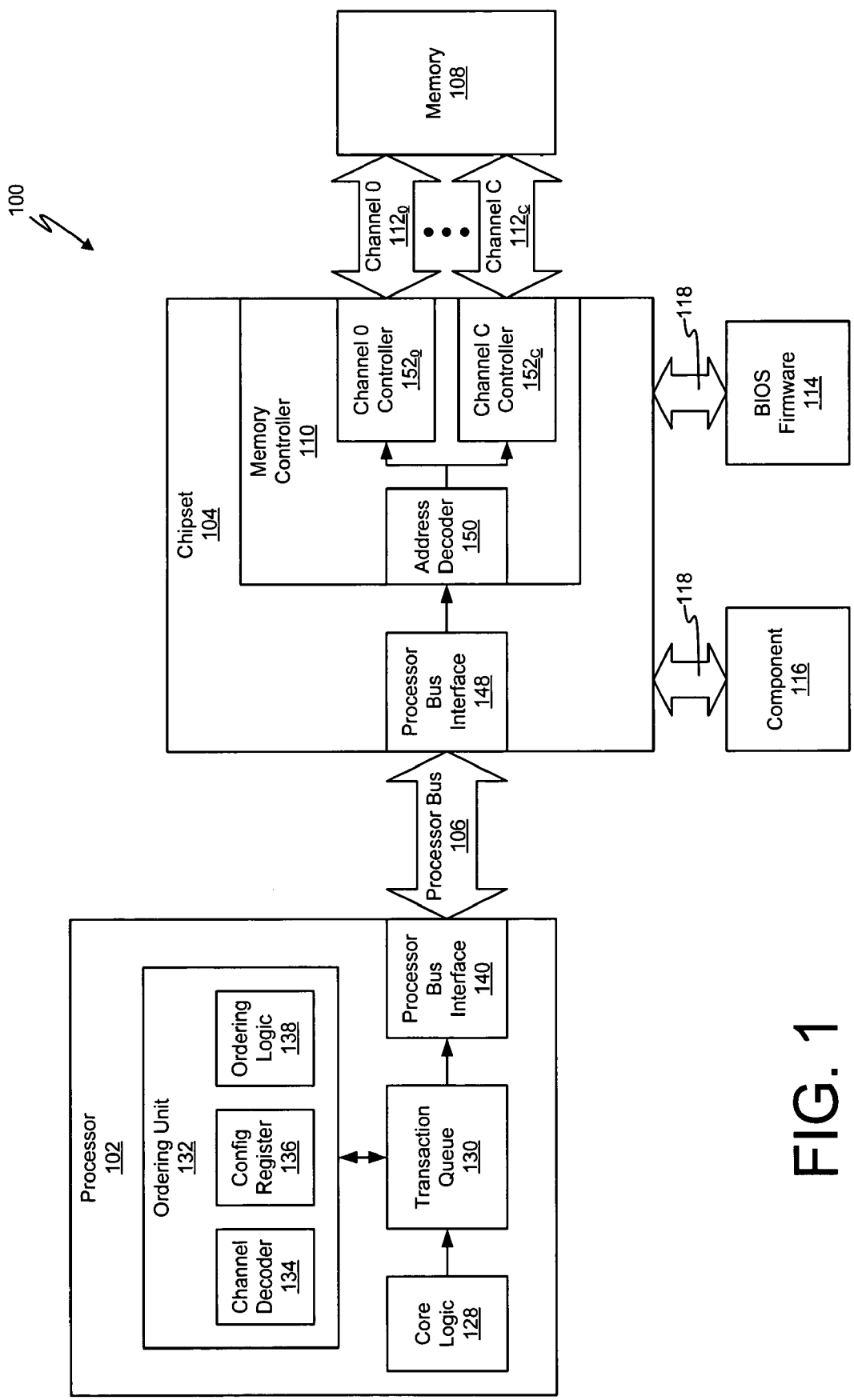
FIG. 1 illustrates an embodiment of a computing device.

An example embodiment of a computing device 100 is shown in FIG. 1. The computing device 100 may comprise a processor 102 and a chipset 104 that is coupled to the processor 102 via a processor bus 106. The computing device 100 may further comprise memory 108 coupled to a memory controller 110 of the chipset 104 via two or more memory channels $112_0 \ldots 112_C$. The computing device 100 may also comprise Basic Input/Output System (BIOS) firmware 114 and other components 116 (e.g. a mouse, keyboard, video controller, hard disk, floppy disk, firmware, etc.). The BIOS firmware 114 and components 116 may be coupled to one or more component interfaces (not shown) of the chipset 104 via buses 118 such as, for example, peripheral component interconnect (PCI) buses, accelerated graphics port (AGP) buses, universal serial bus (USB) buses, low pin count (LPC) buses, and/or other I/O buses.

Figure 2:
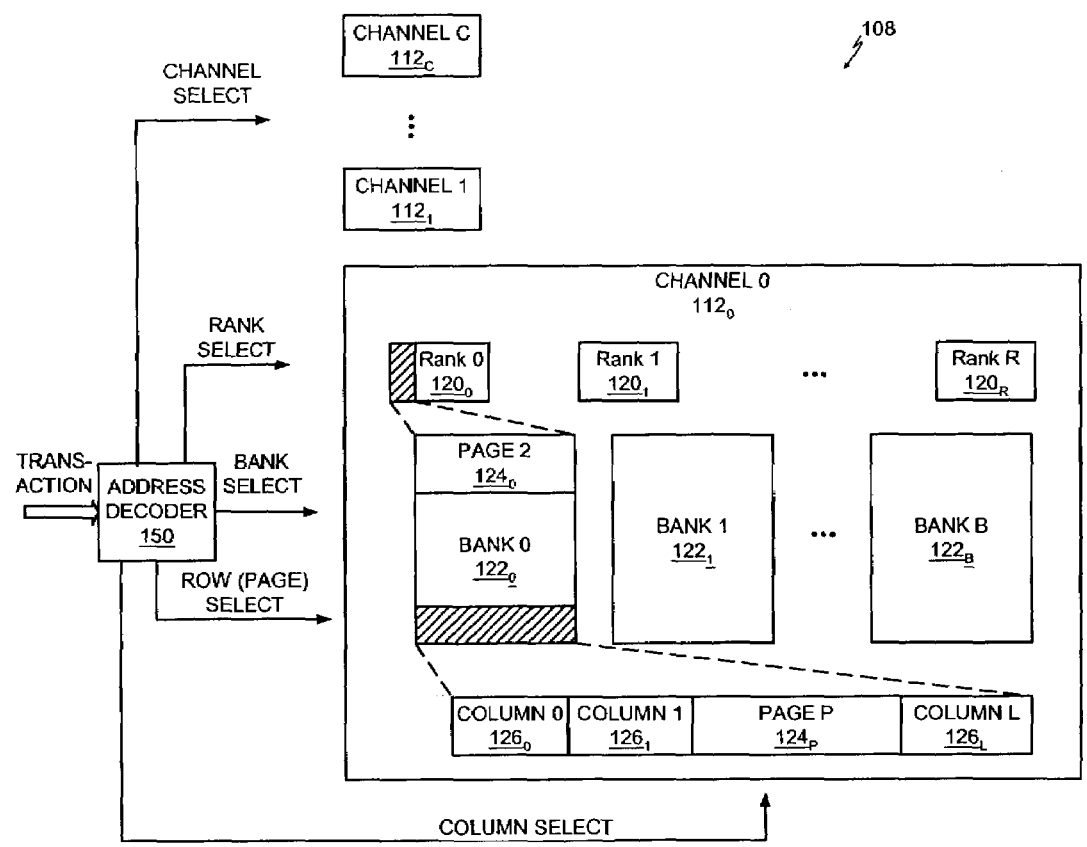
FIG. 2 illustrates an embodiment of a hierarchal memory arrangement of the computing device of FIG. 1.

The memory 108 may comprise various memory devices providing addressable storage locations that the memory controller 110 may read data from and/or write data to. The memory 108 may comprise one or more different types of memory devices such as, for example, dynamic random access memory (DRAM) devices, synchronous dynamic random access memory (SDRAM) devices, double data rate (DDR) SDRAM devices, quad data rate (QDR) SDRAM devices, or other volatile or non-volatile memory devices. Further, as illustrated in FIG. 2, the memory 108 may be arranged in a hierarchal manner. For example, the memory 108 may comprise one or more channels $112_0 \ldots 112_C$, each channel 112 may comprise one or more ranks $120_0 \ldots 120_R$, each rank 120 may comprise one or more banks $122_0 \ldots 122_B$, each bank 122 may comprise one or more rows or pages $124_0 \ldots 124_P$, and each page 124 may comprise one or more chunks or columns $126_0 \ldots 126_L$, and each column 126 may comprise one or more bits or bytes of information. In other embodiments, the memory 108 may comprise more or fewer hierarchal levels than depicted in FIG. 2.

As shown in FIG. 1, one embodiment of the processor 102 may comprise core logic 128 to perform actions in response to executing instructions and a transaction queue or buffer 130 to store bus transactions to be issued on the processor bus 106. In particular, the core logic 128 may generate bus transactions such as memory read transactions and memory write transactions. Since the core logic 128 typically may generate such bus transactions at a rate faster than the bus transactions may be issued on the processor bus 106, the transaction queue or buffer 130 may store the transactions in the order generated (i.e. transaction order) until later serviced.

The processor 102 may further comprise an ordering unit 132 to determine an issue order for issuing memory transactions to the memory controller 110. The ordering unit 132 may determine the issue order based at least in part upon which memory channels $112_0 \ldots 112_C$ are to service the memory transactions and may alter the order of the memory transactions stored in the transaction queue 130 to improve channel utilization. To support such a determination, the ordering unit 132 may comprise a channel decoder 134, one or more configuration registers 136, and ordering logic 138. In general, the channel decoder 134 may determine which memory channel of the two or more memory channels $112_0 \ldots 112_C$ is to service the memory transactions. The channel decoder 134 may determine which memory channel 112 (i.e. target memory channel) is to service the memory transaction using various techniques. In one embodiment, the channel decoder 134 may determine the target memory channel of a memory transaction based upon a memory address associated with the memory transaction. For example, in a two channel example embodiment, a single bit (e.g. address bit 7 of address bits 0 to 31) of the memory transaction address may indicate whether the memory transaction is to be serviced by channel $112_0$ (e.g. bit 7 equal to 0) or is to be serviced by channel $112_1$ (e.g. bit 7 equal to 1). In another embodiment, the channel decoder 134 may decode or partially decode the address to obtain one or more memory selects (e.g. channel select, rank select, bank select, etc.) including at least a channel select that identifies the target channel of the memory transaction.

In order to support several different memory configurations, the channel decoder 134 may be implemented to further determine target channels of memory transactions based upon one or more configuration registers 136. In one embodiment, the BIOS firmware 114 during system initialization may determine the configuration of the memory 108 and may update the configuration registers 136 accordingly. For example, the BIOS firmware 114 may store a bit mask in the configuration register 136 that defines which bit or bits of a memory transaction address correspond to a channel select. Alternatively, the BIOS firmware 114 may store a value (e.g. 0, 1, 2, 3, etc.) in the configuration registers 136 that indicates a channel decode mode for the channel decoder 134.

In one embodiment, the BIOS firmware 114 may configure the processor 102 and the memory controller 110 to interleave memory on a processor cache line basis. For example, in an embodiment having four memory channels $112_0 \ldots 112_3$ and a processor cache line size of 128 bytes, the BIOS firmware 114 may configure the memory controller 110 and the processor 102 to use address bits 7 and 8 of address bits 0 to 31 to specify a target memory channel. As a result of such a configuration, each block of four contiguous cache lines contains a single cache line that maps to one of the four memory channels $112_0 \ldots 112_3$. Accordingly, the processor 102 in such an embodiment may fully utilize the memory channels $112_0 \ldots 112_3$ by issuing memory transactions to retrieve data from memory in sequential cache line order.

The ordering logic 138 may determine an issue order for memory transactions that are generated by the processor 102 in a transaction order and may alter the order of memory transactions in the transaction queue accordingly. It should be appreciated that the ordering logic 132 may alter the order of the memory transactions in the transaction queue in a number of different manners. For example, the ordering logic 138 may update index values associated with the memory transactions to indicate the specified issue order or may move memory transactions from one storage location to another within the transaction queue 130. Further, the ordering logic 138 may determine the issue order based upon the target channels that the channel decoder 134 determined for the memory transactions. In one embodiment, the ordering logic 138 attempts to generate an issue order that results in the processor 102 issuing the memory transactions to the memory controller in a manner that evenly distributes the memory transactions across the memory channels $112_0 \ldots 112_C$. In general, the ordering logic 138 tries to order the memory transactions such that each of the memory channels $112_0 \ldots 112_C$ services a separate memory transaction simultaneously or nearly simultaneously.

Channel distribution of a given sequence of memory transactions may limit reordering opportunities and prevent the ordering logic 138 from ordering the sequence to obtain full channel utilization for the sequence. For example, a sequence may target only a single memory channel (e.g. memory channel $112_0$) or a subset of memory channels (e.g. memory channels $112_0$ and $112_2$ of a four channel system). For such sequences, the ordering logic 138 may be unable to prevent some memory channels 112 from having idle periods while other memory channels 112 service the sequence of memory transactions.

Further, transaction ordering rules may limit reordering opportunities for a sequence of transactions and prevent the ordering logic 138 from ordering the sequence to obtain full channel utilization for the sequence. Besides memory transactions, the processor 102 may further generate other types of bus transactions (e.g. inter-processor interrupts, IO reads, IO writes, interrupt acknowledgments, etc.). These other bus transactions may require that certain memory transactions complete in a certain sequence to retain execution correctness. For such sequences, the ordering logic 138 may be unable to prevent some memory channels 112 from having idle periods while other memory channels 112 service the sequence of memory transactions.

In one embodiment, to simplify the ordering logic 138 of the ordering unit 132, the ordering unit 132 only alters the issue order of memory read transaction sequences. For example, a processor may generate a first sequence of memory read transactions, then one or more non-memory read transactions, and then a second sequence of memory read transactions. The ordering logic 138 may alter the issue order of the first sequence of memory read transactions and may alter the issue order of the second sequence of memory read transactions thus resulting in the processor issuing the first sequence of memory read transactions in an order that differs from the transaction order, then issuing the one or more non-memory read transactions in transaction order, and then issuing the second sequence of memory read transactions in an order that differs from the transaction order.

The processor 102 may further comprise a processor bus interface 140 to handle and issue transactions on the processor bus 106 in an issue order specified by the ordering unit 132. For example, the processor bus interface 140 may issue memory transactions on the processor bus 106 in the specified issue order to request the memory controller 110 to process the memory transaction. Further, the processor bus interface 140 may respond to and/or track transactions that other bus agents such as, for example, the memory controller 110 and other processors (not shown) issue on the processor bus 106.

Figure 3:
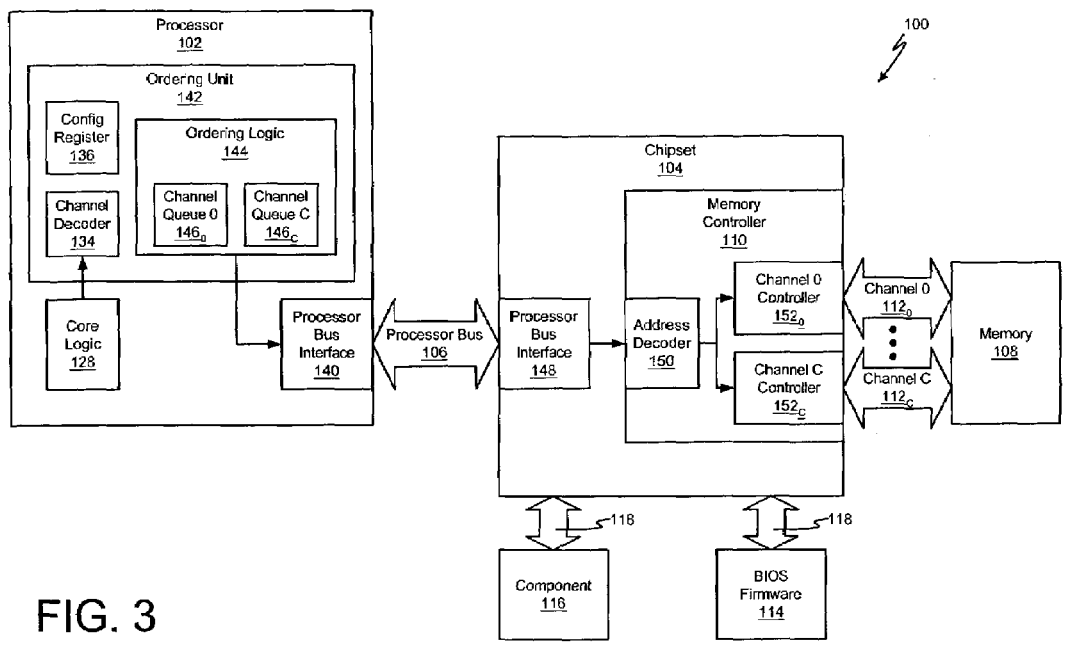
FIG. 3 illustrates another embodiment of a computing device.

Referring now to FIG. 3, another embodiment of the processor 102 is shown. As depicted, the processor 102 may comprise core logic 128 to generate transactions in a transaction order, an ordering unit 142 to determine an issue order for the memory transactions, and a processor bus interface 140 to issue the memory transactions in the specified issue order. As shown, the ordering unit 142 may comprise a channel decoder 134, configuration registers 136, and ordering logic 144. The ordering logic 144 may comprise a channel queue $146_0$ ... $146_C$ for each memory channel $112_0$ ... $112_C$. The ordering logic 138 may receive memory transactions and target channel determinations from the channel decoder 134 in transaction order and may store the received memory transactions in the channel queue $146_0$ ... $146_C$ that corresponds to its target memory channel 112. The processor bus interface 140 may then obtain memory transactions from the channel queues 146 in a circular fashion and may issue the obtained memory transactions in an issue order that evenly distributes the memory transactions across the memory channels $112_0$ ... $112_C$.

Referring to both FIGS. 1 and 2, the chipset 104 may also comprise a processor bus interface 148 to receive and issue transactions on the processor bus 106 in order to communicate with the processor 102. In particular, the processor bus interface 148 of the chipset 104 may receive memory transactions on the processor bus 106 in the issue order specified by the ordering unit 132. Further, the processor bus interface 148 may respond to and/or track transactions that other bus agents such as, for example, the processor 102 and other processors (not shown) issue on the processor bus 106.

The chipset 104 may further comprise a memory controller 110 having an address decoder 150 and two or more channel controllers $152_0$ ... $152_C$ coupled to the memory 108 via the memory channels $112_0$ ... $112_C$. The address decoder 150 may decode the address of a memory transaction to generate one or more memory selects that correspond to the hierarchal arrangement of the memory 108 and that may be used to select or address a particular storage location of the memory 108. In one embodiment, the address decoder 150 may generate from the address of a memory transaction a channel select, a rank select, bank select, page select, and a column select that respectively select a channel 112, rank 120, bank 122, page 124, and column 126 of the, memory 108. Further, the address decoder 150 may select one of the channel controllers $152_0$ ... $152_C$ to process the memory transaction based upon the channel select associated with the memory transaction. For example, in response to the channel select of a memory transaction identifying the first memory channel $112_0$, the address decoder 150 may provide the channel controller $152_0$ associated with the first memory channel $112_0$ with the memory transaction to process. Similarly, in response to the channel select of a memory transaction identifying the last memory channel $112_C$, the address decoder 150 may provide the channel controller $152_C$ associated with the memory channel $112_C$ with the memory transaction to process.

Each of the channel controllers $152_0$ ... $152_C$ may apply one or more memory selects such as, for example, the rank select, bank select, and page select to their respective memory channel $112_0$ ... $112_0$ to open a page 124 of memory 108 that is associated with the memory transaction. Further, each of the channel controllers $152_0$ ... $152_C$ may further apply one or more memory selects such as, for example, the column select to the memory bus 154 to select a column 126 of the opened page 124 for reading and/or writing.

Figure 4:
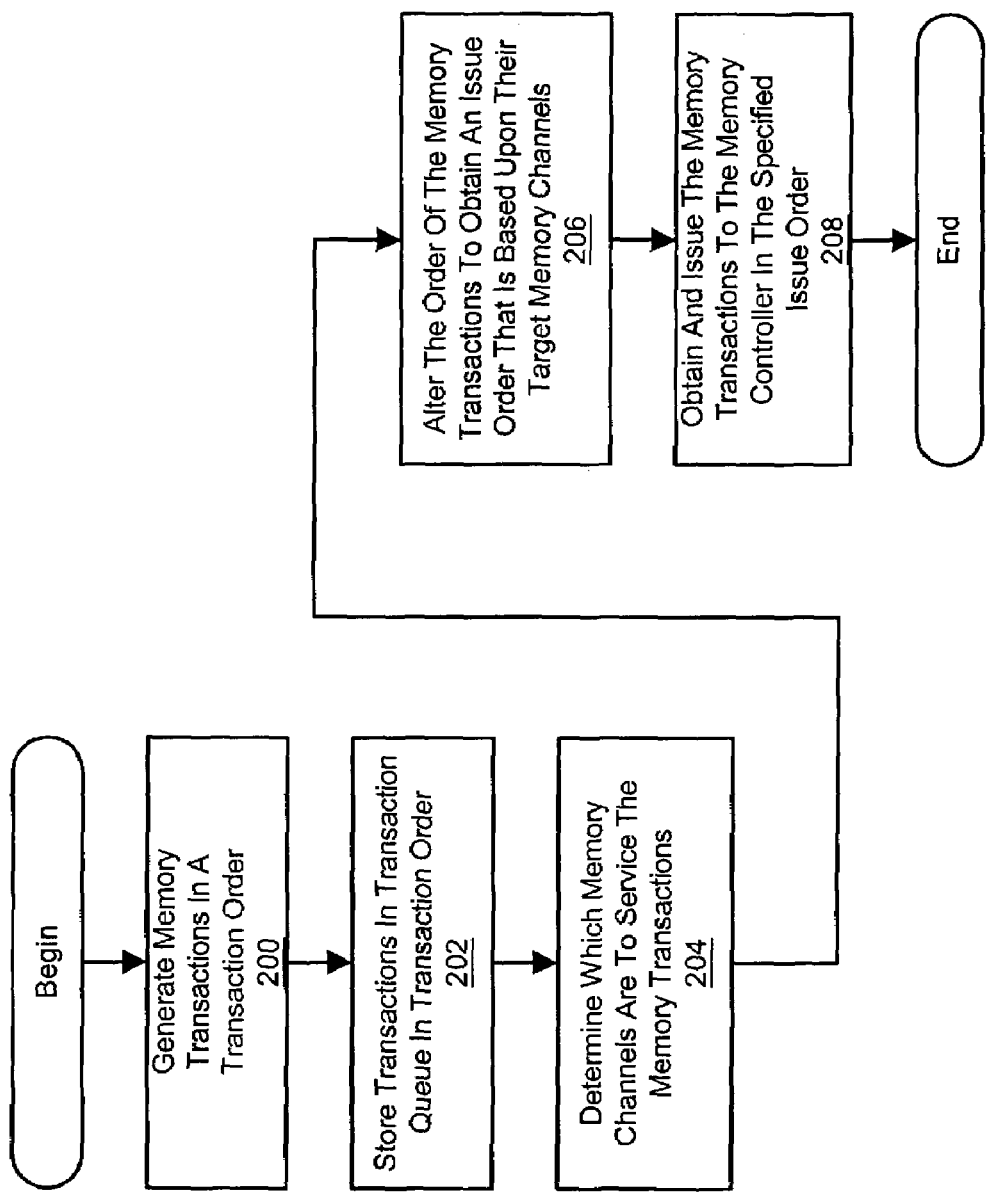
FIG. 4 illustrates an embodiment of a transaction ordering method that may be used by the processor of FIG. 1 to alter the order memory transactions are issued to the memory controller.

Shown in FIG. 4 is an embodiment of a transaction ordering method that may be used by the processor of FIG. 1 to alter the order memory transactions are issued to the memory controller. The core logic 128 of the processor 102 in block 200 may generate a plurality of memory transactions in a transaction order. In block 202, the core logic 128 of the processor 102 may further store the memory transactions in the transaction queue 130 in the order they were generated. For example, the core logic 128 of the processor 102 in one embodiment may simply store each memory transaction at the head of the transaction queue 130 as each memory transaction is generated.

In block 204, the channel decoder 134 may determine a target channel for each of the memory transactions generated by the core logic 128. In one embodiment, the channel decoder 134 may determine a target channel for each memory transaction as each memory transaction is stored in the transaction queue 130. The ordering logic 138 in block 206 may alter the order of the memory transactions to obtain an issue order. In one embodiment, the ordering logic 138 may alter the order of the memory transactions in the transaction queue 130 based upon their target channels so that the memory transactions are presented to the processor bus interface 140 in an issue order. In particular, the ordering logic 138 attempts to alter the order of the memory transactions so that the processor bus interface 140 obtains the memory transactions from the transaction queue 130 in an issue order that results in each memory channel $112_0$ ... $112_C$ servicing memory transactions in parallel.

Finally, the processor bus interface 140 in block 208 may obtain the memory transactions from the transaction queue 130 and issue the memory transactions to the memory controller 110 in the issue order specified by the ordering logic 138. Since the ordering logic 138 in one embodiment alters the order of the memory transactions in the transaction queue 130, the processor bus interface 140 in such an embodiment may merely obtain memory transactions from a tail of the transaction queue 130 and issue the memory transactions to the memory controller 110 in the order in which the processor bus interface 140 obtains them.

Figure 5:
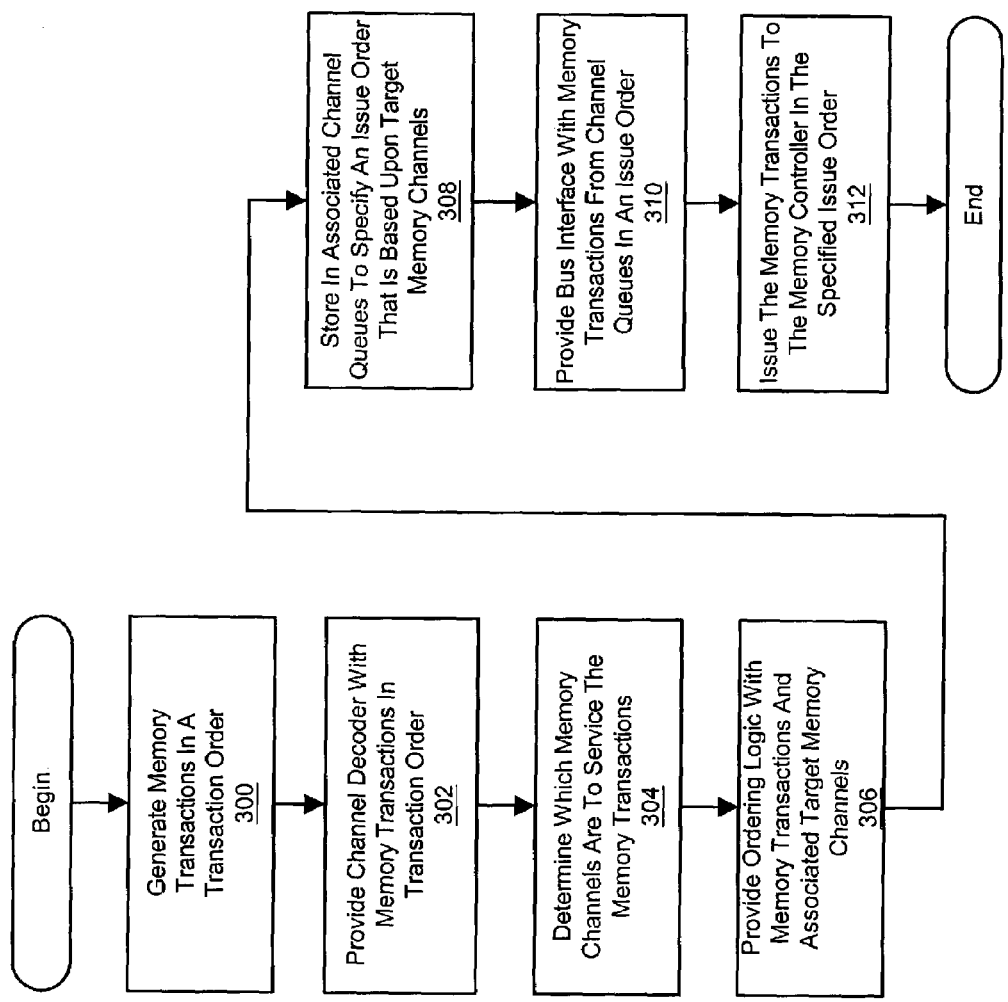
FIG. 5 illustrates another embodiment of a transaction ordering method that may be used by the processor of FIG. 3 to alter the order memory transactions are issued to the memory controller.

Shown in FIG. 5 is another embodiment of a transaction ordering method that may be used by the processor of FIG. 3 to alter the order memory transactions are issued to the memory controller. The core logic 128 of the processor 102 in block 300 may generate a plurality of memory transactions in a transaction order. In block 302, the core logic 128 of the processor 102 may further provide the channel decoder 134 with the memory transactions in the order they were generated.

In block 304, the channel decoder 134 may determine a target channel for each of the memory transactions generated by the core logic 128. In one embodiment, the channel decoder 134 determines a target channel for each memory transaction as each memory transaction is received from the core logic 128. The channel decoder 134 in block 306 may provide the ordering logic 138 with each memory transaction and each associated target channel determination in the same order (i.e. transaction order) received from the core logic 128.

The ordering logic 138 in block 308 may alter the order of the memory transactions to obtain an issue order. In one embodiment, the ordering logic 138 may store transactions received from the channel decoder 134 in an appropriate channel queue 146 based upon the received target channel determinations. The ordering logic 138 in block 310 may provide the processor bus interface 140 with memory transactions from the channel queues 146 in an issue order. In particular, the ordering logic 138 may select memory transaction from the channel queues $146_0 \ldots 146_C$ in a circular fashion, thus providing the processor bus interface 140 with memory transactions in an issue order that evenly distributes the memory transactions across the memory channels $112_0 \ldots 112_C$.

Finally, the processor bus interface 140 in block 312 may issue the memory transactions to the memory controller 110 in the issue order specified by the ordering logic 138. Since the ordering logic 138 in one embodiment provides the processor bus interface 140 with the memory transactions in issue order, the processor bus interface 140 in such an embodiment may merely issue the memory transactions to the memory controller 110 in the order in which the processor bus interface 140 received them.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising
generating in a processor a plurality of memory transactions in response to executing software instructions from a memory,
determining, in the processor, for each memory transaction of the plurality of memory transactions which memory channel of a plurality of memory channels is to service the memory transaction, and
issuing, from the processor, the plurality of memory transactions to a memory controller in an issue order that is based upon the determined memory channels for the plurality of memory transactions.

2. The method of claim 1 wherein determining comprises obtaining channel selects from addresses of the plurality of memory transactions such that each channel select identifies a channel of the plurality of channels.

3. The method of claim 1 wherein determining comprises at least partially decoding addresses of the plurality of memory transactions to obtain a channel select for each of the plurality of channels, the method further comprising
selecting a memory transaction to issue to the memory controller based upon the channel selects of the plurality of memory transactions.

4. The method of claim 1 wherein
generating the plurality of memory transactions comprises generating the plurality of memory transactions in a transaction order, and
issuing the plurality of memory transactions comprises issuing the plurality of memory transaction in a different order than the transaction order.

5. The method of claim 1 further comprising
generating a first memory transaction to be serviced by a first channel,
after generating the first memory transaction, generating a second memory transaction to be serviced by the first channel,
after generating the second memory transaction, generating a third memory transaction to be serviced by a second channel, and
issuing the first memory transaction to the memory controller,
after issuing the first memory transaction, issuing the third memory transaction to the memory controller, and
after issuing the third memory transaction, issuing the second memory transaction to the memory controller.

6. The method of claim 1 further comprising
issuing one memory transaction of the plurality of memory transactions to each channel of the plurality of channels before issuing a second memory transaction to each channel of the plurality of channels.

7. The method of claim 1 wherein determining comprises determining which memory channel based at least in part upon a channel decode mode.

8. For use with a memory controller coupled to memory via a plurality of memory channels, a processor comprising
core logic to execute instructions read from a memory and to generate a plurality of memory transaction in a transaction order in response to executing the instructions,
ordering logic to determine an issue order for the plurality of memory transactions that is based upon which memory channel is to service each memory transaction of the plurality of memory transactions, and
a bus interface to issue the plurality of memory transactions to the memory controller in the issue order.

9. The processor of claim 8 further comprising a channel decoder to determine which memory channel is to service each memory transaction of the plurality of memory transactions.

10. The processor of claim 8 further comprising a channel decoder to obtain for each memory transaction of the plurality of memory transactions a channel select that identifies which memory channel of the plurality of memory channels is to service the corresponding memory transaction.

11. The processor of claim 10 wherein the ordering logic orders the plurality of memory transactions based upon the channel selects to obtain the issue order.

12. The processor of claim 8 further comprising a channel decoder to at least partially decode addresses of the plurality of memory transactions to obtain for each of the plurality of channels a channel select that identifies which memory channel of the plurality of memory channels is to service the corresponding memory transaction.

13. The processor of claim 12 further comprising a programmable register to indicate a channel decode method, wherein the channel decoder decodes the addresses in accordance to the channel decode method indicated by the programmable register.

14. The processor of claim 8 wherein the issue order results in the bus interface issuing one memory transaction to each channel of the plurality of channels before issuing a second memory transaction to each channel of the plurality of channels.

15. A system comprising
a random access memory,
a memory controller coupled to the random access memory via at least two memory channels, and
a processor comprising
core logic to generate a plurality of memory transaction in a transaction order in response to executing instructions of the random access memory,
an ordering unit to determine which memory channel of the at least two memory channels is to service each memory transaction of a plurality of memory transactions and to determine an issue order for the plurality of memory transactions that is based upon the determined memory channel for each memory transaction, and
a bus interface coupled to the memory controller via a bus external to the processor, the bus interface to issue the plurality of memory transactions to the memory controller in the issue order.

16. The system of claim 15 wherein the ordering unit obtains for each memory channel of the plurality of memory transactions a channel select that identifies which memory channel of the plurality of memory channels is to service the corresponding memory transaction.

17. The system of claim 15 wherein the ordering unit at least partially decodes addresses of the plurality of memory transactions to obtain for each of the plurality of channels a channel select that identifies which memory channel of the plurality of memory channels is to service the corresponding memory transaction.

18. The system of claim 17 further comprising a programmable register to indicate a channel decode mode, wherein the ordering unit decodes the addresses in accordance to the channel decode mode indicated by the programmable register.

19. The system of claim 15 wherein the issue order results in the bus interface issuing one memory transaction to each channel of the plurality of channels before issuing a second memory transaction to each channel of the plurality of channels.

20. A tangible machine-readable medium comprising a plurality of instructions stored therein that in response to being executed by a processor, result in the processor:
determining a target memory channel for each memory transaction of a plurality of memory transactions that have a transaction order, and
determining an issue order for the plurality of memory transactions based upon the target memory channel determined for each memory transaction of the plurality of memory transactions.

21. The tangible machine-readable medium of claim 20 wherein the plurality of instructions in response to being executed further result in the processor
determining the target memory channel for each memory transaction by obtaining, from addresses of the plurality of memory transactions, channel selects that identify the target memory channel for each memory transaction of the plurality of memory transactions, and
determining the issue order based at least upon the channel selects obtained for the plurality of memory transactions.

22. The tangible machine-readable medium of claim 20 wherein the plurality of instructions in response to being executed further result in the processor
determining the target memory channel for each memory transaction by at least partially decoding addresses of the plurality of memory transactions to obtain channel selects that identify the target memory channel for each memory transaction of the plurality of memory transactions,
determining the issue order based at least upon the channel selects obtained for the plurality of memory transactions.

23. The tangible machine-readable medium of claim 20 wherein the plurality of instructions in response to being executed further result in the processor
determining the issue order such that the issue order results in issuing one memory transaction to each channel of the plurality of channels before issuing a second memory transaction to each channel of the plurality of channels.

24. The tangible machine-readable medium of claim 20 wherein the plurality of instructions in response to being executed further result in the processor
determining the target memory channel for each memory transaction based at least in part upon a channel decode mode.

* * * * *